United States Patent [19]

Porter et al.

[11] Patent Number: 5,080,306

[45] Date of Patent: Jan. 14, 1992

[54] MULTI-LAYER STITCHED BLANKET INSULATION

[75] Inventors: John W. Porter, Poway; Neal C. White; Jeffrey D. Holdridge, both of San Diego, all of Calif.

[73] Assignee: General Dynamics Corporation, Space Systems Division, San Diego, Calif.

[21] Appl. No.: 418,603

[22] Filed: Oct. 10, 1989

[51] Int. Cl.$^5$ .............................................. B64G 1/58
[52] U.S. Cl. ............................ 244/158 A; 428/920; 428/408
[58] Field of Search .................. 244/121, 133, 158 A, 244/160, 163; 428/920, 902, 408, 422, 433, 434

[56] References Cited

U.S. PATENT DOCUMENTS

| | | | |
|---|---|---|---|
| 3,286,951 | 11/1966 | Kendall | 244/160 |
| 4,373,003 | 2/1983 | Schomburg et al. | 428/920 |
| 4,535,017 | 8/1985 | Kuckein et al. | 244/158 A |
| 4,567,076 | 1/1986 | Therrien | 428/408 |
| 4,667,907 | 5/1987 | Hujsak et al. | 244/158 A |
| 4,767,656 | 8/1988 | Chee et al. | 244/158 A |
| 4,877,689 | 10/1989 | Onstott | 244/158 A |
| 4,925,134 | 5/1990 | Keller et al. | 244/158 A |

FOREIGN PATENT DOCUMENTS 3741732 12/1988 Fed. Rep. of Germany ... 244/158 A

Primary Examiner—Galen L. Barefoot
Attorney, Agent, or Firm—John R. Duncan; Frank D. Gilliam

[57] ABSTRACT

A multi-layer blanket insulation adapted of use in an aerobrake intended to assist in the return of a space vehicle from a higher earth orbit to a low earth orbit for recovery and possible reuse. Between two face sheets of a cloth material highly resistant to elevated temperatures are interposed a layer of a flexible insulative material and a layer of non-porous foil. The insulation is stitched together into a predetermined pattern. A backside stiffener may be secured to the back face by a layer of a suitable cloth material.

15 Claims, 1 Drawing Sheet

U.S. Patent        Jan. 14, 1992        5,080,306
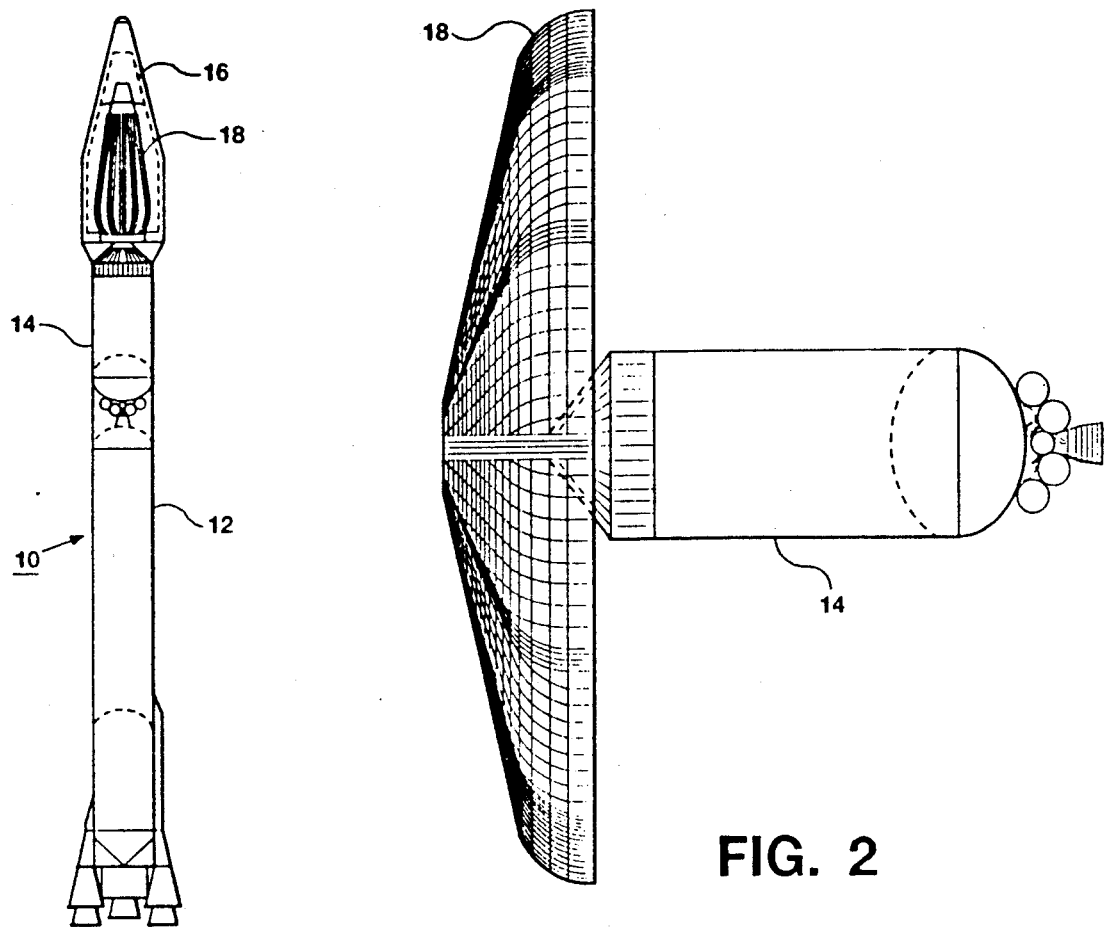
FIG. 1
FIG. 2
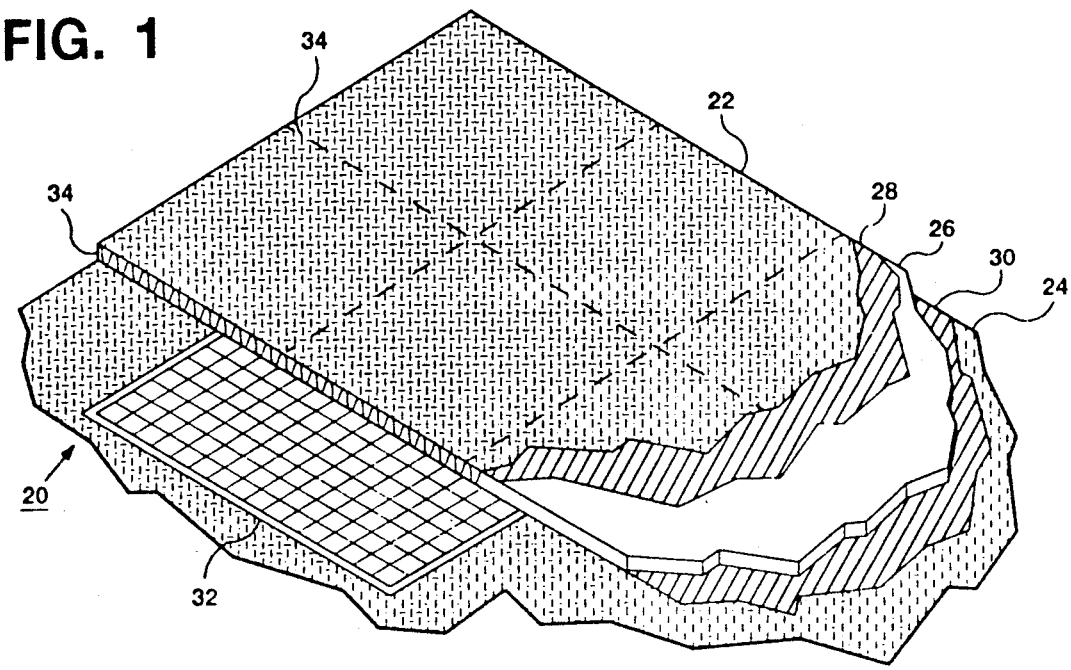
FIG. 3

MULTI-LAYER STITCHED BLANKET INSULATION

BACKGROUND OF THE INVENTION

1. Field of the Invention

This invention relates to an improvement in aerobrakes for space vehicles and more particularly, but not by way of limitation, to a multi-layer blanket insulation designed to function in a deployable/retractable aerobrake for a space vehicle.

2. Description of the prior art

It is known that multi-stage launch vehicles are the most efficient means to place payloads from Earth into high orbits. An approach is to consider current launch vehicles, with the exception of the U.S. Space Shuttle, are expendable assets, i.e. they are discarded after use.

The first stage or booster rocket typically expends at 70 to 100 nautical miles altitude. One or more upper stage rockets deliver the spacecraft or other payload to higher orbits or to an escape trajectory. The expended upper stages then burn up as they fall back to earth.

This is an expensive approach since complete launch vehicles cost tens to hundreds of millions of dollars. The upper stages may also cost from seven to seventy million dollars. Obviously this is expensive and will become even more so as space flight becomes more common. Thus, it becomes attractive to design launch vehicles for reuse.

A concept for an upper stage vehicle is the Space Transfer Vehicle ("STV"). This vehicle is designed to deliver payloads to geosynchronous earth orbit ("GEO") or higher. This vehicle will return to a low earth orbit ("LEO") for Space Shuttle or Space Station recovery, servicing, and reuse. Aerobraking appears to be the most cost effective and technically efficient means of recovering the vehicle to the desired orbit. It utilizes an aeromaneuver to dissipate excess velocity at LEO as opposed to carrying extra propellant and performing a retroburn.

However, aerobraking from GEO to LEO for recovery does present formidable technical challenges. To stay in a high orbit, an object must have high velocity (about 33,500 ft./sec. for GEO). To return and stay in a low orbit, an object must have lower energy (about 25,500 ft./sec. for a 160 nautical mile Space Shuttle orbit). Aerobraking is done by attaching a high aerodynamic drag device on a transfer vehicle returning from GEO, or other high energy mission and causing the vehicle to dip into the outer fringe of the Earth's atmosphere and to come out again one or more times. This path through the atmosphere or "aerocorridor" the vehicle must pass through is predetermined so that the high drag device (aerobrake) to slows the vehicle to around 25,500 ft./sec. as it emerges from its last pass through the atmosphere. This allows the STV to remain at a targeted LEO for rendezvous with a recovery Space Shuttle or a Space Station. Aerobrakes can be fixed or deployable. Aerobrakes will probably be in the range of 30 to 80 feet in diameter, so fixed brakes will probably be installed in space.

A deployable aerobrake must be capable of being contained within the payload envelope of the payload fairing or cargo bay of the launch vehicle to be folded to a stowed position and then deployed to an operating position. After braking the vehicle, the deployable aerobrake may possibly be subsequently retracted again to a stowed position to allow return to Earth. A successful aerobrake requires the use of a suitable thermal protection system.

The thermal protection system (TPS) used for the aerobrake is the single most important element in its design. Without a satisfactorily performing thermal protection system, the aerobrake cannot function properly. The major requirement for the TPS is that it must withstand the aerothermal healing environment encountered during the aeromaneuver without rupturing, tearing, or leaking or burning through. A desired requirement is that the brake be reuseable which, for a deployable aerobrake, implies that it must be fairly flexible both before and after encountering this heating.

Two major types of TPS are in current use for space vehicles. First is the rigid TPS of which two main subcategories are available. These are carbon-carbon (C-C) and fibrous refractory composite insulation. Because of the requirements on the retractable aerobrake for self deployment and retraction, a rigid type of TPS can be used only on small designated areas of this type of aerobrake. Of the two rigid types of TPS, the properties of carbon-carbon exceeded the temperature requirements but its cost is substantially higher than that of the fibrous refractory composite insulation. Carbon-carbon material is subject to oxidation and ablation. Fibrous refractory composite insulation can be made into tiles and is used extensively on the Space Shuttle. A fibrous refractory composite insulation tile coated with SiC can easily withstand all temperatures expected to experienced by the areobrake. Both rigid systems are about twice as heavy as flexible TPS.

The majority of the aerobraking surface for a deployable aerobrake must be covered by a flexible thermal protection system. NASA has developed several types of flexible insulation materials for the Space Shuttle program but all such materials are insufficient in terms of temperature limits. Recently NASA has been developing a new flexible thermal protection system known as Tailorable Advanced Blanket Insulation (TABI). It consists of a three dimensional woven refractory ceramic fabric with strips of insulating refractory felt running within the fabric. The upper, lower, and batten surfaces are made of this fabric. When this material is fabricated, all three fabric elements can be woven together in one process.

However, NASA's TABI is not suitable for the subject aerobrake because the folding concept for the contemplated aerobrake would require the TABI material to be folded in a direction that is perpendicular to the battens, which is in the blanket,'s stiffest direction. Also, the TABI material is somewhat porous. If an attempt were to be made to stop the porosity by coating the backside with an adhesive such a step would add unacceptable weight to the system, would require the web thicknesses to be doubled (to keep the backside temperature of the web below 550° F.), and would decrease the flexibility of the aerobrake.

Thus, the present state of the art materials do not meet the requirements for this application of flexibility, low weight, low permeability porosity, and satisfactory temperature limits. It is believed that the present invention fully meets these requirements and makes practical the desired aerobrake for the STV.

SUMMARY OF THE INVENTION

Briefly stated, the present invention provides a multilayer blanket insulation particularly adapted for use in an aerobrake intended to assist in the return of a space vehicle from a geosynchronous earth orbit or higher to a low earth obit for recovery, servicing, and reuse. The aerobrake is subject to be unfolded from a retracted position to a deployed position which is subject to temperatures equalling or exceeding 2200° F. on its front face while retaining sufficient flexibility to be refolded to a retracted position. The multi-layer blanket insulation of the present invention includes a first layer of cloth material that is heat resistant to a temperature up to 2600° F. It is followed by a sheet of non-porous metal foil, there's a layer of flexible insulative felt material. A second sheet of non-porous foil optionally comes next, followed by a second layer of cloth material. The second cloth layer may be the same as the front and at least one layer of non-porous cloth or may be less heat resistant to about 1800° F. A thread material that is adapted to withstand elevated temperatures is used to sew or stitch the two layers of cloth material, the layer of insulative material, and the non-porous foil together. Preferably, the aforesaid elements are stitched together in a square pattern. The multi-layer blanket insulation of the present invention may also include a layer of stiffener material on its backside which preferably comprises a stainless steel screen material. This addition would be strategically placed to allow for easy aerobrake folding by introducing an area with more characteristics.

Accordingly, it is an object of the present invention to provide a thermal protection system for an aerobrake for a space vehicle that is sufficiently flexible, meets the required temperature limits, and has no porosity. Other objects and advantages of the invention will be evident from the following detailed description, when read in conjunction with the accompanying drawing which illustrates the invention.

BRIEF DESCRIPTION OF THE DRAWINGS

FIG. 1 is a simplified perspective of an exemplary space transfer vehicle which has a aerobrake packaged in the payload fairing. The aerobrake employs the multi-layer blanket insulation of the present invention.

FIG. 2 is a simplified depiction of a space vehicle with the aerobrake being illustrated in a deployed position.

FIG. 3 is a perspective detail of a multi-layer blanket insulation which is constructed in accordance with a preferred embodiment of the instant invention.

DETAILED DESCRIPTION OF THE DRAWING FIGURES

Referring now to the drawing in detail and in particular to FIG. 1, the reference character 10 generally designates an exemplary launch vehicle. The launch vehicle 10 comprises a suitable booster vehicle 12. The booster 12 has detachably secured to it a suitable upper stage rocket 14 which in this instance is the space transfer vehicle. The upper stage rocket 14 is provided with a suitable payload fairing 16 within which is positioned the exemplary aerobrake 18 which may be deployed to permit the rocket 14 to be returned from a geosynchronous or other high energy orbit to a low earth orbit in a desired manner. Referring now to FIG. 2, it will be seen that the aerobrake 18, which was generally illustrated in a folded stowed position in FIG. 1, is diagrammatically illustrated in both a deployed position. The aerobrake 18 utilizes the multi-layer blanket insulation of the instant invention.

In FIG. 3 the multi-layer blanket insulation 20 is illustrated as preferably comprising a first layer of cloth material 22 that is heat resistant to a temperature equalling or exceeding 2600° F. The first layer 22, which is the hot face of the insulation 20, is preferably made from a Silicon Carbide cloth that is woven in an 8 harness satin weave. Silicon Carbide cloth may be purchased under the trade name Nicalon. Nicalon is made by the Nippon Carbon Co. of Japan and is distributed in the U.S. by the Dow Corning company. Nicalon is a fabric made of pseudo-SiC threads and its temperature limit for reuse and flexibility retention is approximately 2600° F.

The multi-layer blanket insulation 20 of the present invention includes a second layer 24 which comprises a cloth material that is heat resistant to an elevated temperature as for example between 1000° F. and 2000° F. This second layer 24 which is the backside of the insulation 20 is preferably made from an aluminaborosilicate cloth that contains a high percentage of boria 10%. The layer 24 is a fabric that is woven of aluminaborosilicate thread and is sold by the 3M company under the tradename Nextel. The Nextel 312 fabric is preferred for the layer 24.

The multi-layer insulation 20 includes a layer of flexible insulative material 26 that is positioned between the first and second layers of cloth material 22 and 24. The flexible insulative material 26 preferably comprises a layer of aluminaborosilicate felt material which has a low boria ($<2\%$) content. A preferred material 26 may be obtained as a Nextel 440 felt.

At least one layer of a non-porous foil is positioned between the first and second layers 22 and 24 of cloth material. In the illustrated preferred embodiment of the present invention, this layer 28 of non-porous foil takes the form of a 0.5 to 2 mil thick 304L corrosion resistant steel (CRES) foil. The foil layer 28 precludes porosity of the insulation 20 without adding excessive weight to the blanket insulation 20.

While at least one layer 28 of the thin stainless steel foil is illustrated as being interposed between the hot face 22 and the insulative felt material 26, it is within the scope of the invention to provide another layer 30 of the same thin foil material of which layer 28 is interposed between the back face 24 and the insulative felt material 26.

For areas of the multi-layer blanket where a backside stiffener is required, a suitable stainless steel screen panel 32 may be positioned against the back face 24 and held in place by a suitable sewn-on heat resistant sheet of cloth material such as Nextel 312.

The multi-layer blanket insulation 20 has its various layers held together by such layers being suitably sewn/stitched together by a heat resistant thread 34 such as a Nicalon thread. The stitching of thread 34 allows for blanket flexibility while still holding the components of the blanket together. The stitching spacing must be chosen so that the frangible felt material 26 is protected. If the spacing is too large, the covering layers 22 and 24 would flutter and destroy both the fabric of such layers and the felt material 26. If the spacing is too small, the mechanical properties of the materials will be damaged by the stitching process and flexibility may be decreased. For the present application and materials a nominal six inch spacing in a square quilted pattern is preferred.

Although plain weave cloth may be used on the upper and lower cloth surfaces 22 and 24, the weave patterns can be chosen to give differing flexibility and thermal characteristics. For example the noted 8 harness satin weave can be used to provide a denser cloth. Also, the metallic foil sheet thickness and number can be changed to modify the blanket insulation's properties. In the illustrated embodiment, the multi-layer blanket insulation 20 tolerates a front face 22 exposure to 2600° F. while the back face 24 stabilizes at less than 600° F.

From the foregoing, it is apparent that a novel multi-layer blanket insulation has been provided for use in an aerobrake intended to assist in the return of a space vehicle from a geosynchronous earth orbit or higher to a low earth orbit for recovery, servicing and reuse. This aerobrake is subject to being deployed from a retracted, stowed position to a deployed position where it could be subjected to temperatures equalling or exceeding 2600° F. without losing significant flexibility. The quilted blanket insulation overcomes the difficulties of the present state of the art insulation materials and is non-porous, flexible, and temperature resistant to the required service temperatures.

Changes may be made in the combination and arrangement of the various elements of the insulation without departing from the spirit and scope of the following claims.

What is claimed is:

1. A thermal protection system comprising:
   an aerobrake for use to assist in the return of a space vehicle from a geosynchronous earth orbit or higher to a low earth orbit for recovery, servicing and reuse, said aerobrake is subject to be folded from a retracted position to a deployed position where it could be subjected to temperatures equalling 2600° F. on its front face while retaining sufficient flexibility to be refolded to a retracted position; and
   a multi-layer blanket insulation attached to said face of said aerobrake, said thermal blanket comprising a first layer of cloth material that is heat resistant to a temperature equalling or exceeding 2500° F., a second layer of cloth material that is heat resistant to elevated temperatures, a layer of flexible insulative material that is positioned between the first and second layers of cloth material, at least one layer of non-porous foil that is also positioned between the first and second layers of cloth material and thread material adapted to withstand elevated temperatures that is used to sew the two layers of cloth, the layer of insulative material, and the non-porous foil together.

2. The multi-layer blanket insulation as defined in claim 1 wherein the first layer of cloth material is woven of a refractory material.

3. The multi-layer blanket insulation as defined in claim 2 wherein the first layer of cloth material is woven with a silicon carbide thread.

4. The multi-layer blanket insulation as defined in claim 1 wherein the second layer of cloth material is woven of a refractory material.

5. The multi-layer blanket insulation as defined in claim 3 wherein the second layer of cloth material is woven of aluminaborosilicate thread.

6. The multi-layer blanket insulation as defined in claim 1 wherein the insulative material comprises felted refractory material.

7. The multi-layer blanket insulation as defined in claim 1 wherein the insulative material comprises a fibrous silica material.

8. The multi-layer blanket insulation as defined in claim 1 wherein the non-porous foil comprises a metallic foil.

9. The multi-layer blanket insulation as defined in claim 8 wherein the non-porous foil comprises a stainless steel foil.

10. The multi-layer blanket insulation as defined in claim 1 which includes a plurality of layers of non-porous foil.

11. The multi-layer blanket insulation as defined in claim 10 wherein at least one layer of foil is interposed between the first later of cloth material and the layer of insulative material and at least one layer of foil is interposed between the layer of insulative material and the second layer of cloth material.

12. The multi-layer blanket insulation as defined in claim 1 wherein the thread material sews the multiple layers and foil together in a quilted manner.

13. The multi-layer blanket insulation as defined in claim 12 wherein the thread material stitches the multiple layers and included foil layer together in a square quilted pattern that precludes fluttering of the first layer in use while not damaging the mechanical properties of the blanket insulation during the stitching together of the blanket insulation.

14. The multi-layer blanket insulation as defined in claim 1 which further includes a layer of stiffener material secured to the second layer of cloth material.

15. The multi-layer blanket insulation as defined in claim 14 wherein the layer of stiffener is secured to the second layer of cloth material by a layer of cloth material that is resistant to elevated temperatures.

* * * * *